(12) United States Patent
Lepine et al.

(10) Patent No.: US 9,964,145 B2
(45) Date of Patent: May 8, 2018

(54) SUSPENSION THRUST BEARING DEVICE

(71) Applicant: Aktiebolaget SKF, Gothenburg (SE)

(72) Inventors: Thomas Lepine, Villandry (FR); Xavier Blanchard, Saint-Cyr-sur-Loire (FR); Bruno Montboeuf, Saint-Cyr-sur-Loire (FR); Desire Vidot, Ballan-Miré (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/452,094

(22) Filed: Mar. 7, 2017

(65) Prior Publication Data

US 2017/0261032 A1 Sep. 14, 2017

(30) Foreign Application Priority Data

Mar. 11, 2016 (DE) .................. 10 2016 204 015

(51) Int. Cl.
*F16C 19/12* (2006.01)
*B60G 15/06* (2006.01)
*F16C 33/58* (2006.01)

(52) U.S. Cl.
CPC ............ *F16C 19/12* (2013.01); *B60G 15/068* (2013.01); *F16C 33/585* (2013.01); *B60G 2204/418* (2013.01); *F16C 2326/05* (2013.01)

(58) Field of Classification Search
CPC .... F16C 2326/05; F16C 19/12; F16C 33/585; B60G 15/068; B60G 2204/418
See application file for complete search history.

(56) References Cited

U.S. PATENT DOCUMENTS

| 8,226,301 B2 * | 7/2012 | Poulle | B60G 11/15 |
| | | | 280/124.145 |
| 8,496,383 B2 * | 7/2013 | Viault | B60G 15/068 |
| | | | 267/217 |
| 2010/0014792 A1 * | 1/2010 | Kellam | B60G 15/067 |
| | | | 384/196 |
| 2011/0274384 A1 * | 11/2011 | Montboeurf | B60G 15/068 |
| | | | 384/607 |

(Continued)

FOREIGN PATENT DOCUMENTS

EP 2 152 531 B1 2/2010

*Primary Examiner* — Thomas R Hannon
(74) *Attorney, Agent, or Firm* — Bryan Peckjian; SKF USA Inc. Patent Dept.

(57) ABSTRACT

A suspension thrust bearing provides a bearing with annular upper part and annular lower part. The lower part provides an axial hub, an outwardly projected radial flange extending from the axial hub, and a curved connecting portion between the axial hub and radial flange. The lower part provides an exterior support surface that axially supports an upper end of a suspension spring by a damping device made from resilient material. The exterior support surface provides at least one longitudinal groove, the damping device including an interior surface contacting the exterior support surface and including a complementary shape to mate with the groove. The groove extends along the connecting portion, disposed in a recessed portion between two longitudinal side walls, a first groove end on or directed towards the hub, and a second groove end on or directed towards the flange, the second groove end being a transverse wall.

11 Claims, 6 Drawing Sheets

(56) References Cited

U.S. PATENT DOCUMENTS

2016/0089947 A1* 3/2016 Bedeau ................... F16C 27/08
  248/634
2016/0146253 A1* 5/2016 Weiss, II ................... F16F 9/54
  188/321.11

* cited by examiner

SUSPENSION THRUST BEARING DEVICE

CROSS REFERENCE TO RELATED APPLICATIONS

This application claims priority to German patent application no. 102016204015.4 filed on 3 Nov. 2016, the contents of which are fully incorporated herein by reference.

FIELD OF THE INVENTION

The present invention concerns the field of suspension thrust bearings, in particular of the MacPherson type. Such suspension thrust bearings equip suspension strut for use in a motor vehicle.

BACKGROUND OF THE INVENTION

As a general rule, a motor vehicle suspension system provides a suspension strut supporting an axle and a vehicle wheel. A suspension thrust bearing is disposed in an upper portion of the suspension strut, opposite to the wheel and the ground, and between a suspension spring and an upper support block attached to the body of the vehicle.

The suspension thrust bearing includes at least one rolling bearing.

The suspension thrust bearing enables transmission of axial forces between the spring and the body of the vehicle and, in the meantime, allows relative angular movement between the spring, which is mobile in rotation, and the fixed support block attached to the body.

To this end, the spring is supported by a spring seat provided on the suspension thrust bearing. More precisely, the suspension thrust bearing provides a lower support surface resting on ending coils of the spring. The spring support surface provides a radial surface to support axial force. The spring support surface may also provide a tubular axial surface to support radial deformations and to ensure the spring centering.

It is known to provide a damping device axially and radially disposed between the spring and the spring support surface of the suspension thrust bearing. As shown in these documents, the damping device is attached to the lower surface of the suspension thrust bearing. Damping device is made from a resilient material, such as rubber, thermoplastic elastomer (TPE), in particular thermoplastic polyurethane (TPU), melt processible elastomer (MPE) or elastomer cellular foam.

The damping device can be a separate component assembled in place by hand as part of the spring support surface. Alternatively, the damping device can be directly molded onto the spring support surface. Nevertheless, shocks and vibrations exerted by the spring during the use of vehicle can disassembled the damping device from the suspension thrust bearing.

The document US 2010/0014792 A1 proposes annular grooves supported by the spring seat, the damping device comprising a corresponding shape fitted within the grooves. However, the damping device and the spring seat may relatively rotate one to the other. The damping device material is softer than the spring seat and then it could be worn.

The document EP 2 152 531 B1 discloses longitudinal grooves blocking the rotation of the damping device. Furthermore, the longitudinal grooves provide flaring side walls so as to prevent radial movement of the damping device. However, such grooves have a relative complex design.

BRIEF SUMMARY OF THE INVENTION

The aim of the invention is to provide a suspension thrust bearing with a damping device of optimized retention means while simplifying the manufacturing and assembly processes of the suspension thrust bearing itself.

To this end, the invention concerns a suspension thrust bearing for use with a suspension spring in an automotive suspension strut. The suspension thrust bearing provides a bearing with upper and lower annular parts in relative rotation. The lower annular part provides an axial hub, an outwardly projected radial flange extending from the axial hub, and a curved connecting portion between the axial hub and radial flange. The lower annular part provides an exterior support surface that axially supports an upper end of a suspension spring by the intermediate of a damping device made from resilient material. The exterior support surface provides at least one longitudinal groove, the damping device comprising an interior surface in contact with the exterior support surface and including a complementary shape so as to mate with the at least one longitudinal groove.

According to the invention, the at least one longitudinal groove extends at least partly along the connecting portion. The longitudinal groove consists in a recessed portion between two longitudinal side walls, a first groove end on or directed towards the hub, and a second groove end on or directed towards the flange, the second groove end being a transverse wall.

Thanks to the invention, the damping device is prevented from any movement relatively to the lower cap.

More precisely, the longitudinal side walls prevent the damping device rotation, the transverse wall prevent any radial movement in the outer radial direction, the connecting portion and the hub prevent any radial movement in the inner radial direction, the connecting portion prevents any upper axial movement, and the suspension spring prevents any lower axial movement.

The arrangement of the elements according to the invention, and in particular the shape of the longitudinal groove, permit a robust suspension thrust bearing before (during transport for example) and during its service life.

According to further aspects of the invention which are advantageous but not compulsory, such a suspension thrust bearing may incorporate one or several of the following features:

The suspension thrust bearing provides a bearing with an inner ring fixed to an upper cap, so as to form the upper annular part of the suspension thrust bearing, and an outer ring fixed to a lower cap, so as to form the lower annular part of the suspension thrust bearing.

The inner and outer rings are made from a stamped metal sheet.

The upper and lower caps are made from a rigid plastic material.

The upper and/or lower caps may provide stiffening insert.

The bearing consists in a rolling bearing, the inner and outer rings defining an annular rolling chamber between them and at least one row of rolling elements being disposed within the rolling chamber.

The rolling elements are balls.

The damping device is directly molded on the lower part.

The damping device is made from a resilient material, such as rubber thermoplastic elastomer (TPE), in particular thermoplastic polyurethane (TPU), melt processible elastomer (MPE) or elastomer cellular foam.

The longitudinal groove extends along the hub to the connecting portion.

The longitudinal groove extends from the connecting portion to the flange.

The first end of the longitudinal groove is open to the lower edge of the hub.

The first end of the longitudinal groove is a transverse wall.

The exterior support surface provides a plurality of parallel longitudinal grooves.

The longitudinal grooves are circumferentially equally spaced.

Additional retention means are provided to the hub and/or the flange.

Additional retention means consist in a set of parallel longitudinal grooves extending only along the flange and/or extending only the hub.

Each of the additional longitudinal grooves is in the extension of a longitudinal groove that at least partly extends along the connecting portion, a protrusion of material longitudinally separating the two grooves.

Additional retention means consist in a set of pins provided only on the flange and/or provided only on the hub.

BRIEF DESCRIPTION OF THE SEVERAL VIEWS OF THE DRAWING

The invention will now be explained in correspondence with the annexed figures, as an illustrative example, without restricting the object of the invention. In the annexed figures.

DETAILED DESCRIPTION OF THE INVENTION

Figure 1:
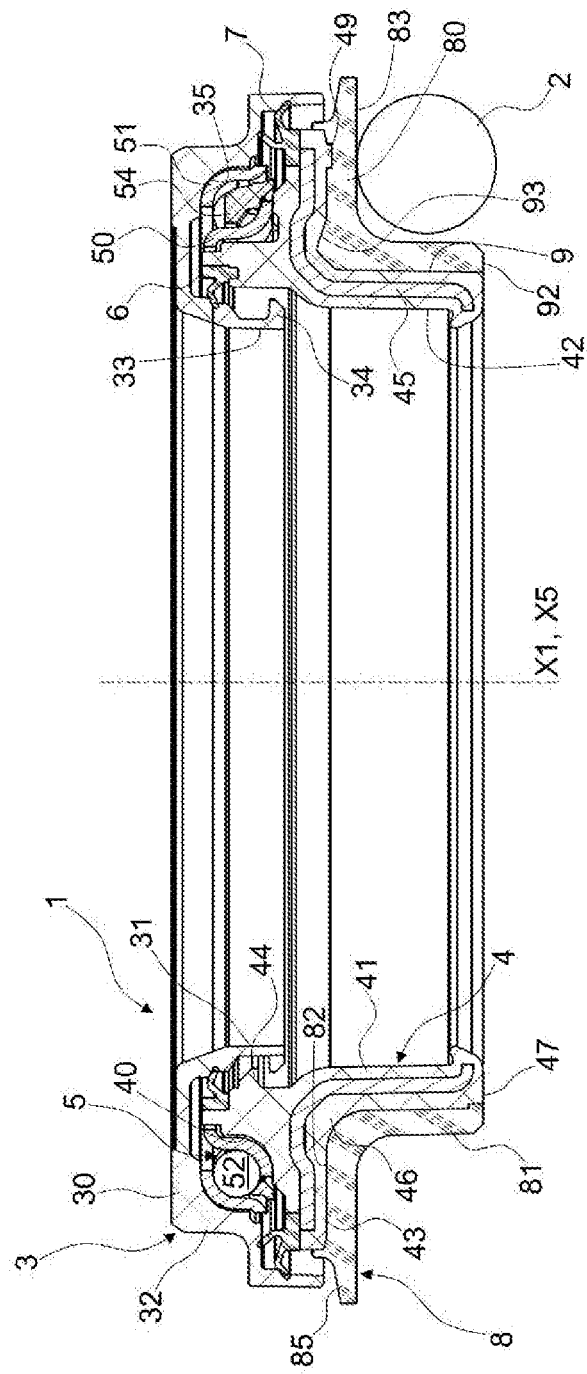
FIG. 1 is a sectional view of a suspension thrust bearing according to a first embodiment of the invention.
Figure 2:
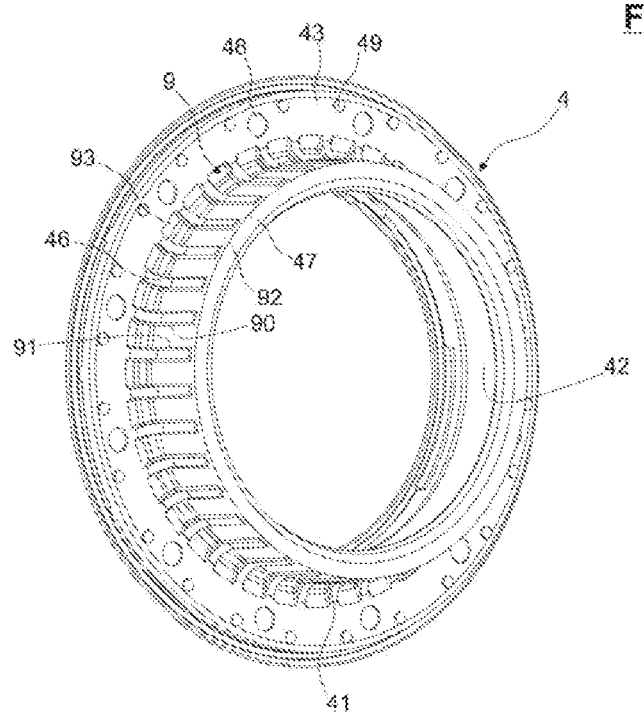
FIG. 2 is a perspective view of a lower cap according to the first embodiment of the invention.
Figure 3:
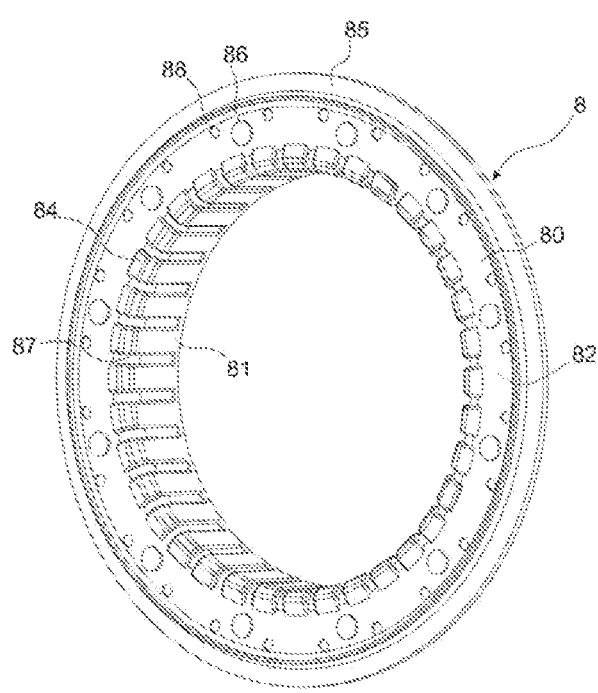
FIG. 3 is a perspective view of a damping device according to the first embodiment of the invention.

According to a first embodiment of the invention in FIGS. 1 to 3, a suspension thrust bearing 1 with central axis X1 is mounted between a coil spring 2 and a support block (not shown) connected to the chassis of a motor vehicle. Such suspension thrust bearing 1 can be used, for example, in an automotive MacPherson strut assembly.

Hereinafter, the adjectives "axial" and "radial" are defined relative to the central axis X1 of the annular thrust bearing 1.

The suspension thrust bearing 1 provides an upper cap 3, a lower cap 4 and a single rolling bearing 5. In this embodiment, these three components 3, 4 and 5 are of globally circular shape about a central axis X5 coinciding with the central axis X1 when the suspension thrust bearing 1 is not loaded.

The upper cap 3 consists in a one-piece part made from plastic synthetic material, for example from polyamide, optionally reinforced with glass fibers. The upper cap 3 has an upper radial portion 30, an inner annular skirt 31 of relatively small diameter and extending towards the lower side of the suspension thrust bearing 1, and an outer annular skirt 32 of relatively large diameter and extending towards the lower side of the suspension thrust bearing 1.

The inner skirt 31 defines an inner bore 33 for the suspension thrust device 1 wherein an elongate shock absorber rod (not shown) is mounted.

The inner skirt 31 includes a hook 34 that may be continuous or discontinuous in the circumferential direction, taking the form of an axial projection directed towards the interior side of the suspension thrust bearing 1.

The upper cap 3 is dedicated to be fixed to a support block of the automotive vehicle chassis.

The rolling bearing 5 provides a pressed sheet metal inner race 50, an outer race 51 also of pressed sheet metal, a row of rolling elements 52, here balls, and a cage 54 for maintaining a regular circumferential spacing between the rolling elements 52. The rolling elements 52 are disposed between raceways formed by toroidal portions of the inner race 50 and outer race 51.

As an alternative not shown, no rolling elements need to be used but rather the inner and outer races may directly contact each other, with a suitable low friction material, coating, or lubricant being used.

The rolling bearing 5 is integrally radially located between the inner skirt 31 and the outer skirt 32 of the upper cap 3. The outer race 51 is fitted within a toroidal inner portion 35 of the upper cap 3.

The inner race 50 is fitted onto a toroidal outer portion 40 of the lower cap 4.

The lower cap 4 provides a hub 41 defining an inner bore 42 wherein the rod axially extends. The lower cap 4 further provides an outwardly projecting radial flange 43 that extends from the hub 41 towards the exterior of the suspension thrust bearing 1. The lower cap 4 provides a curved connecting portion 46 between the axial hub 41 and radial flange 43.

The toroidal outer portion 40 supporting the inner race 50 of the rolling bearing is provided on an upper surface of the radial flange 43.

The lower cap 4 includes an inner radial protrusion 44 so as to cooperate with the hook 34 of the upper cap 3 to guarantee axial retention of the upper cap 3 with the lower cap 4 between which the rolling bearing 5 is clamped.

The lower cap 4 provides a stiffening insert 45 extending along the hub 41 and the flange 43 so as to support the load and the shocks exerted by the spring 2. The stiffening insert may be in metal or in a rigid plastic. As an alternative not shown, the upper cap 3 may also provide a stiffening insert.

Inner sealing means 6 are provided between an inner periphery of the radial portion 43 of the lower cap 4 and the inner skirt 31 of the upper cap 3. Outer sealing means 7 are provided between an outer periphery of the radial portion 43 of the lower cap 4 and the outer skirt 32 of the upper cap 3.

The lower cap 4 further provides a damping device 8 made from a resilient material.

The damping device 8 is made from a resilient material, such as rubber thermoplastic elastomer (TPE), in particular thermoplastic polyurethane (TPU), melt processible elastomer (MPE) or elastomer cellular foam.

The damping device 8 provides a radial portion 80 and a tubular axial portion 81. The radial portion 80 provides an interior surface 82 tightly fastened to the lower side of the radial flange 43 of the lower part 4. The radial portion 80 provides a lower radial side 83 for receiving an end turn of the suspension spring 2 in bearing contact.

The radial portion 80 of the damping device 8 supports axial load and shocks from the suspension spring 2.

The tubular axial portion 81 axially extends from the radial portion 80 towards the lower side of the suspension thrust bearing 1. The tubular axial portion 81 is tightly fastened to an outer cylindrical surface of the hub 41 of the lower cap 4.

The tubular axial portion 81 of the damping device 8 supports radial load and shocks from the suspension spring 2.

The tubular axial portion 81 and radial portion 80 of the damping device 8 are connected together so as to cover the exterior surface of the axial hub 41, the radial flange 43 and the curved connecting portion 46 of the lower cap 4.

According to the first embodiment of the invention, the exterior surface of the lower cap 4 provides a plurality of longitudinal grooves 9.

The longitudinal grooves 9 are circumferentially equally spaced.

Each of the longitudinal grooves 9 extends from the lower peripheral edge 47 of the hub 41. The longitudinal grooves further extend through the curved connecting portion 46.

Each of the longitudinal grooves 9 consists in a recessed portion between two longitudinal side walls 90, 91, a first groove end 92 open to the lower edge 47 of the hub 41, and a second groove end 93 on the connecting portion 46 and directed towards the flange. The second groove end 93 is a transverse wall.

The damping device 8 provides an interior surface 82 in contact with the exterior support surface of the lower part 4 and includes a plurality of ribs 84 of complementary shape with the longitudinal grooves 9 so as to mate with. The damping device 8 defines longitudinal recesses 87 to receive the separating protrusions between each of the circumferentially successive grooves 9.

The damping device 8 is mechanically retained to the lower cap 4 by the cooperation of the ribs 84 with the longitudinal grooves 9.

More precisely, the ribs 84 are blocked in rotation between the two longitudinal side walls 90, 91 of the grooves. The damping device 8 is prevented from rotating relatively to the lower cap 4.

The ribs 84 are axially blocked in the direction towards the upper side of the suspension thrust bearing 1, by the extension of the longitudinal grooves to the curved connecting portion 46. Since the damping device is supporting the suspension spring 2, the damping device 8 is then prevented from any axial movement relatively to the lower cap 4.

The ribs 84 are radially blocked by the transverse walls 93 forming the second groove ends of the longitudinal grooves 9. The transverse walls 93 are provided towards the flange 43 and then are in a shifted radial position relatively to the hub 41. The ribs 84 are radially in abutment against the walls 93 in the outer radial direction, and against the connecting portion 46 and the hub 41 in the inner radial direction. The damping device 8 is then prevented from any radial movement relatively to the lower cap 4.

Moreover, since the first groove ends 92 are open, the damping means 8 can be either manually mounted or overmoulded to the lower cap 4.

According to the embodiment of FIGS. 1 to 3, the damping device 8 further provides an outwardly radially projected flange 85 that extends from the radial portion 80 towards the exterior of the suspension thrust bearing 1. The flange 85 extends above the outer skirt 32 of the upper cap so as to form a sealing deflector.

According to the embodiment of FIGS. 1 to 3, the damping means 8 and the lower cap 4 further provide additional retention means for the damping means.

The exterior surface of the flange 43 of the lower cap 4 provides a plurality of recesses 48 that are circumferentially equally spaced. The radial portion 80 of the damping means 8 provides pins 86 that axially extends towards the lower cap 4. The pins 86 are of complementary shape with the recesses 48 so as to mate with.

The exterior surface of the flange 43 of the lower cap 4 provides a plurality of pins 49 that axially extends towards the damping means 8. The radial portion 80 of the damping means 8 provides recesses 88 that of complementary shape with the pins 49 so as to mate with.

The combination of pins and recesses provides a radial and anti-rotational retention function between the damping means 8 and the lower cap 4. Such retention means are not necessary but are only complementary means to the longitudinal grooves 9 and ribs 84. They are of particular use when the damping means is overmoulded onto the lower cap 4 so as to provide additional attachment surfaces.

As an alternative not shown, the suspension thrust bearing 1 may not provide any of these additional pins and recesses.

Figure 4:
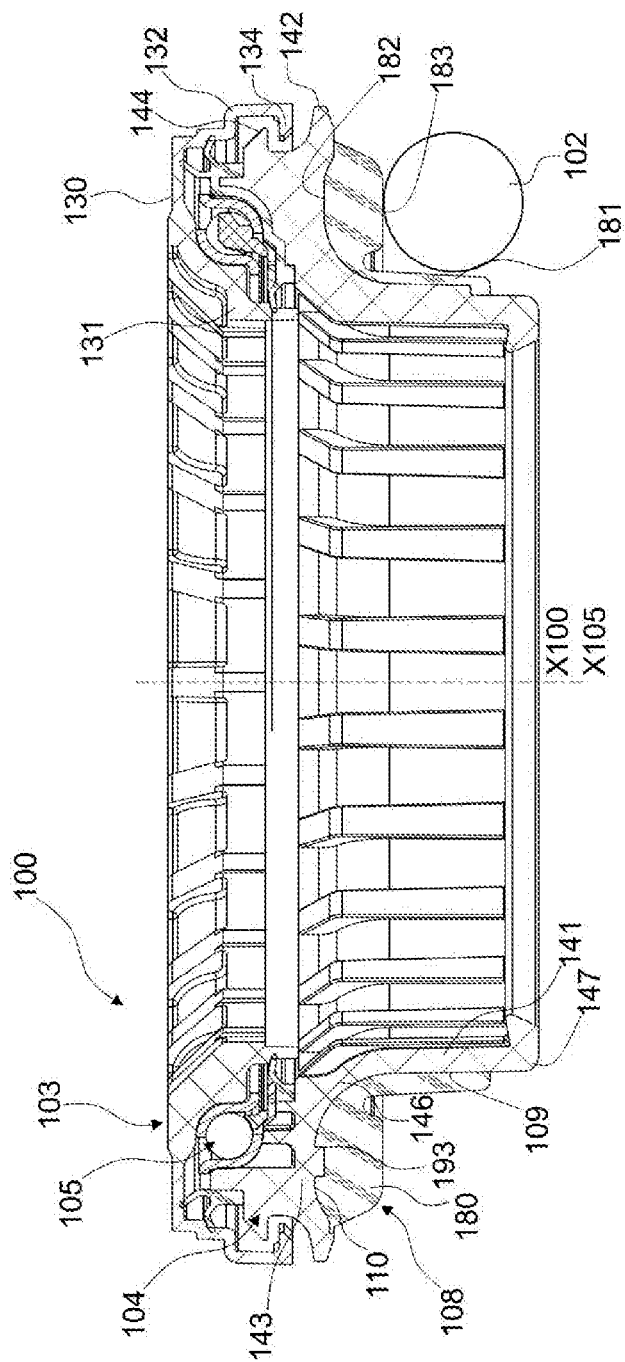
FIG. 4 is a sectional view of a suspension thrust bearing according to a second embodiment of the invention.
Figure 5:
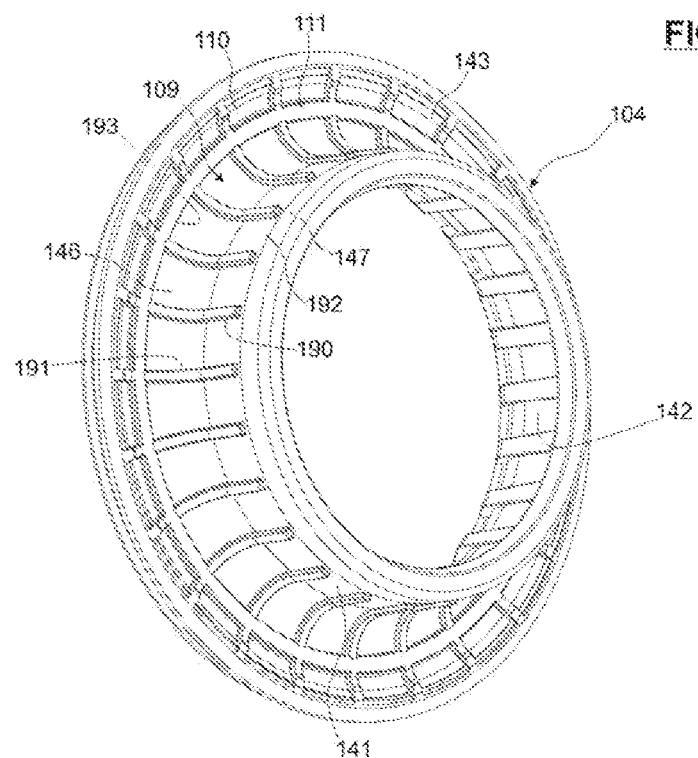
FIG. 5 is a perspective view of a lower cap according to the second embodiment of the invention.
Figure 6:
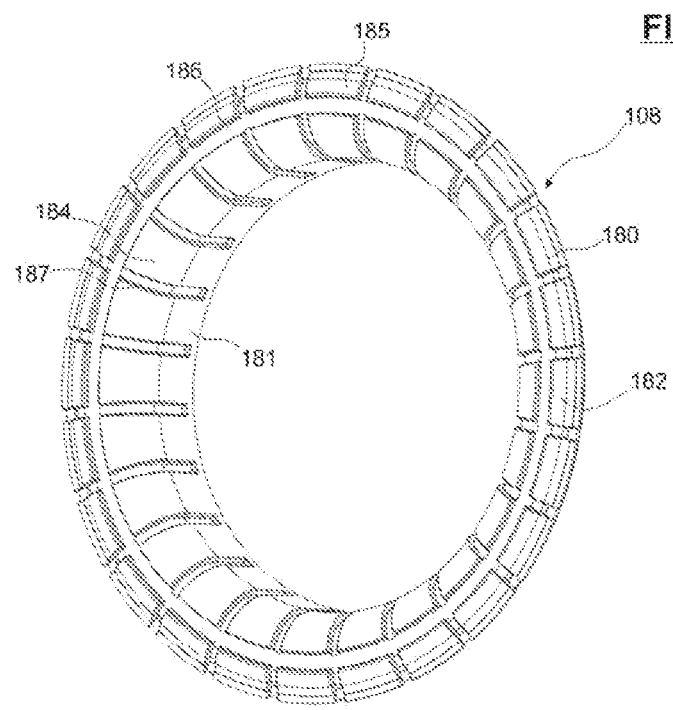
FIG. 6 is a perspective view of a damping device according to the second embodiment of the invention.

According to a second embodiment of the invention in FIGS. 4 to 6, a suspension thrust bearing 100 with central axis X100 is mounted between a coil spring 102 and a support block (not shown) connected to the chassis of a motor vehicle.

The suspension thrust bearing 100 provides an upper cap 103, a lower cap 104 and a single rolling bearing 105. These three components 103, 104 and 105 are of globally circular shape about a central axis X105 coinciding with the central axis X100 when the suspension thrust bearing 100 is not loaded.

The upper cap 103 has an upper radial portion 130, an inner annular skirt 131 of relatively small diameter and extending towards the lower side of the suspension thrust bearing 100, and an outer annular skirt 132 of relatively large diameter and extending towards the lower side of the suspension thrust bearing 100.

The outer skirt 131 includes a hook 134 taking the form of an axial projection directed towards the interior side of the suspension thrust bearing 100.

The rolling bearing 105 is similar the rolling bearing 5 described for the first embodiment of the invention. The rolling bearing 105 is integrally radially located between the inner skirt 131 and the outer skirt 132 of the upper cap 103.

The lower cap 104 provides a hub 141, an outwardly projecting radial flange 143 that extends from the hub 141 towards the exterior of the suspension thrust bearing 1, and a curved connecting portion 146 between the axial hub 141 and radial flange 143.

The lower cap 104 includes an outer radial protrusion 144 so as to cooperate with the hook 134 of the upper cap 103.

The lower cap 104 further provides an outwardly radially projected flange 142 that extends from the radial flange 143 towards the exterior of the suspension thrust bearing 100. The flange 142 extends above the outer skirt 132 of the upper cap 103 so as to form a seal.

The lower cap 104 further provides a damping device 108 made from a resilient material.

The damping device 108 provides a radial portion 180 and a tubular axial portion 181. The radial portion 180 provides an interior surface 182 tightly fastened to the lower side of the radial flange 143 of the lower part 104. The radial portion 180 provides a lower radial side 183 for receiving an end turn of the suspension spring 102 in bearing contact.

The tubular axial portion 181 axially extends from the radial portion 180 towards the lower side of the suspension thrust bearing 100. The tubular axial portion 181 is tightly fastened to an outer cylindrical surface of the hub 141 of the lower cap 104.

The tubular axial portion 181 and radial portion 180 of the damping device 108 are connected together so as to cover the exterior surface of the axial hub 141, the radial flange 143 and the curved connecting portion 146 of the lower cap 104.

According to the second embodiment of the invention, the exterior surface of the lower cap 104 provides a plurality of longitudinal grooves 109.

The longitudinal grooves 109 are circumferentially equally spaced.

Each of the longitudinal grooves 109 extends from the lower peripheral edge 147 of the hub 141. The longitudinal grooves 109 further extend through the curved connecting portion 146 to the flange 143.

Each of the longitudinal grooves 109 consists in a recessed portion between two longitudinal side walls 190, 191, a first groove end 192 open to the lower edge 147 of the hub 141, and a second groove end 193 on the flange 143. The second groove end 193 is a transverse wall.

The damping device 108 provides an interior surface 182 in contact with the exterior support surface of the lower part 104 and includes a plurality of ribs 184 of complementary shape with the longitudinal grooves 109 so as to mate with.

According to the embodiment of FIGS. 4 to 6, the damping means 108 and the lower cap 104 further provide additional retention means for the damping means.

Additional retention means consist in a set of parallel longitudinal grooves 110 extending only along the flange 143.

Each of the additional longitudinal grooves 110 is in the extension of a longitudinal groove 109 that extends from the connecting portion 146. A protrusion 111 of material longitudinally separates the two grooves 109, 110.

The interior surface 182 of the damping device 108 in contact with the exterior support surface of the lower part 104 further include a plurality of ribs 185 of complementary shape with the longitudinal grooves 110 so as to mate with. The damping means 180 defines an annular groove 186 to receive the protrusion 111 of the lower cap 104, and longitudinal recesses 187 to receive the separating protrusions between each of the circumferentially successive grooves 109, 110.

As an alternative not shown, the suspension thrust bearing 100 may not provide any of these additional grooves 110 provided to the flange 143 of the lower cap 104.

Figure 7:
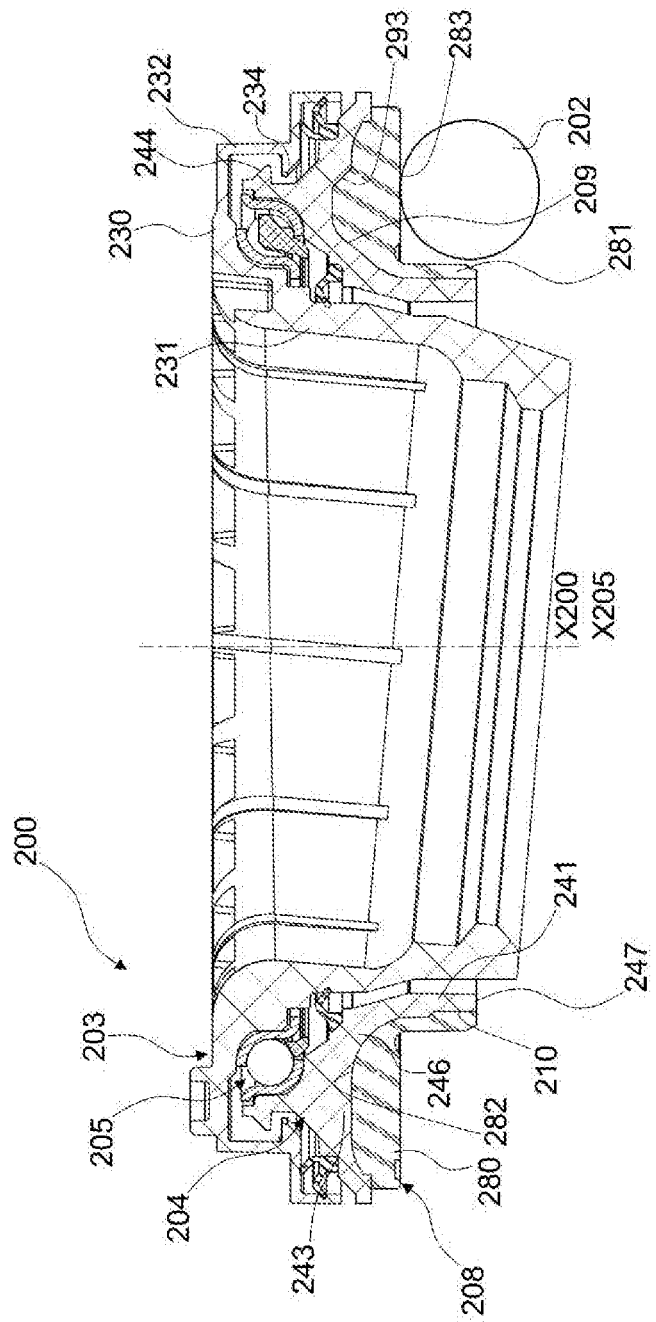
FIG. 7 is a sectional view of a suspension thrust bearing according to a third embodiment of the invention.
Figure 8:
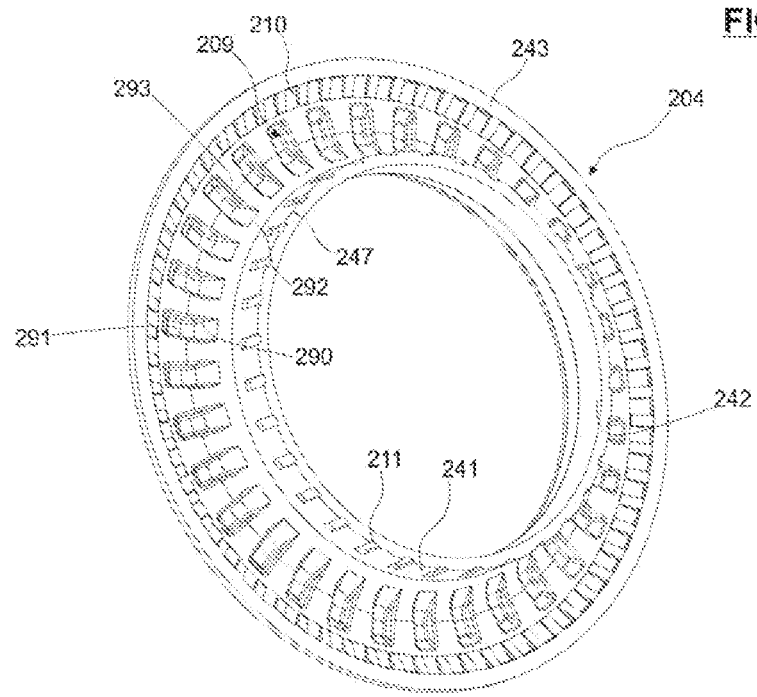
FIG. 8 is a perspective view of a lower cap according to the third embodiment of the invention.
Figure 9:
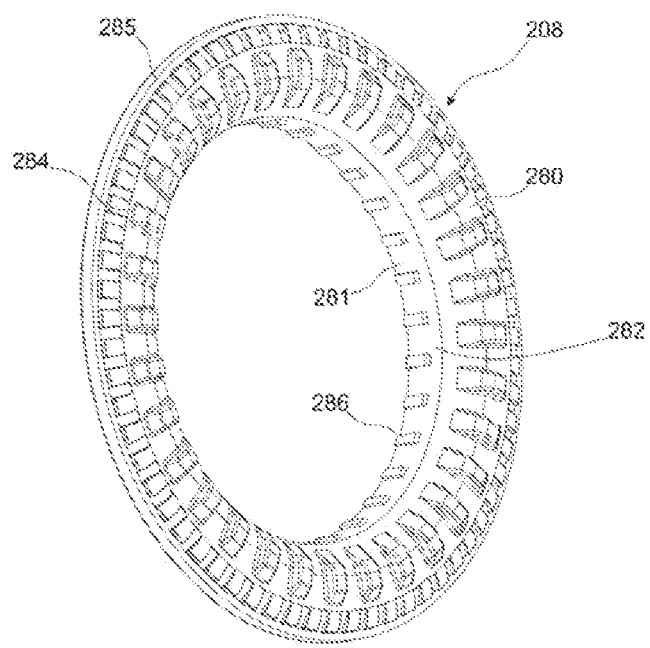
FIG. 9 is a perspective view of a damping device according to the third embodiment of the invention.

According to a third embodiment of the invention in FIGS. 7 to 9, a suspension thrust bearing 200 with central axis X200 is mounted between a coil spring 202 and a support block (not shown) connected to the chassis of a motor vehicle.

The suspension thrust bearing 200 provides an upper cap 203, a lower cap 204 and a single rolling bearing 205. These three components 203, 204 and 205 are of globally circular shape about a central axis X205 coinciding with the central axis X200 when the suspension thrust bearing 200 is not loaded.

The upper cap 203 has an upper radial portion 230, an inner annular skirt 231 of relatively small diameter and extending towards the lower side of the suspension thrust bearing 200, and an outer annular skirt 232 of relatively large diameter and extending towards the lower side of the suspension thrust bearing 100.

The outer skirt 232 includes a hook 234 taking the form of an axial projection directed towards the interior side of the suspension thrust bearing 200.

The rolling bearing 205 is similar the rolling bearing 5 described for the first embodiment of the invention. The rolling bearing 205 is integrally radially located between the inner skirt 231 and the outer skirt 232 of the upper cap 203.

The lower cap 204 provides a hub 241, an outwardly projecting radial flange 243 that extends from the hub 241 towards the exterior of the suspension thrust bearing 1, and a curved connecting portion 246 between the axial hub 241 and radial flange 243.

The lower cap 204 includes an outer radial protrusion 244 so as to cooperate with the hook 234 of the upper cap 203.

The lower cap 204 further provides a damping device 208 made from a resilient material.

The damping device 208 provides a radial portion 280 and a tubular axial portion 281. The radial portion 280 provides an interior surface 282 tightly fastened to the lower side of the radial flange 243 of the lower part 204. The radial portion 280 provides a lower radial side 283 for receiving an end turn of the suspension spring 202 in bearing contact.

The tubular axial portion 281 axially extends from the radial portion 280 towards the lower side of the suspension thrust bearing 200. The tubular axial portion 281 is tightly fastened to an outer cylindrical surface of the hub 241 of the lower cap 204.

The tubular axial portion 281 and radial portion 280 of the damping device 208 are connected together so as to cover the exterior surface of the axial hub 241, the radial flange 243 and the curved connecting portion 246 of the lower cap 204.

According to the third embodiment of the invention, the exterior surface of the lower cap 204 provides a plurality of longitudinal grooves 209.

The longitudinal grooves 209 are circumferentially equally spaced.

Each of the longitudinal grooves 209 extends from an upper portion of the hub 241. The longitudinal grooves 209 further extend through the curved connecting portion 246 to the flange 243.

Each of the longitudinal grooves 209 consists in a recessed portion between two longitudinal side walls 290, 291, a first groove end 292 being a on the hub 141, and a second groove end 293 on the flange 243. The first second groove ends 292, 293 are transverse walls.

The damping device 208 provides an interior surface 282 in contact with the exterior support surface of the lower part 204 and includes a plurality of ribs 284 of complementary shape with the longitudinal grooves 209 so as to mate with.

According to the embodiment of FIGS. 7 to 9, the damping means 208 and the lower cap 204 further provide additional retention means for the damping means.

Additional retention means consist in a set of parallel longitudinal grooves 210 extending only along the flange 243. The set of grooves 210 is radially outwardly offset relative to ends 292 of the grooves 209.

Another set of parallel longitudinal grooves 211 extends only along the hub. The set of grooves 210 is axially offset relative to the ends 293 of the grooves 209. The grooves 210 are open to the lower edge 247 of the hub 241.

The interior surface 282 of the radial portion 280 of the damping device 208 includes a plurality of ribs 285 of complementary shape with the longitudinal grooves 210. The interior surface 282 of the axial portion 281 of the damping device 208 includes a plurality of ribs 286 of complementary shape with the longitudinal grooves 211.

The invention claimed is:

1. A suspension thrust bearing to be used in conjunction with a suspension spring in an automotive suspension strut, the thrust bearing comprising:
   a bearing with annular upper part and annular lower part in relative rotation with each other, wherein
   the lower part includes an axial hub, an outwardly projected radial flange extending from the axial hub, and a curved connecting portion disposed between the axial hub and radial flange, wherein
   the lower part includes an exterior support surface that axially supports an upper end of a suspension spring by the intermediate of a damping device made from resilient material, wherein
   the exterior support surface includes at least one longitudinal groove, the damping device having an interior surface in contact with the exterior support surface and including a complementary shape to mate with the at least one longitudinal groove, and wherein
   the at least one longitudinal groove extends at least partly along the connecting portion, the longitudinal groove disposed in a recessed portion between two longitudinal side walls, a first groove end on or directed towards the hub, and a second groove end on or directed towards the flange, the second groove end being a transverse wall.

2. The suspension thrust bearing according to claim 1, wherein the suspension thrust bearing provides a bearing with an outer ring fixed to an upper cap, to form the upper annular part of the suspension thrust bearing, and an inner ring fixed to a lower cap, to form the lower annular part of the suspension thrust bearing.

3. The suspension thrust bearing according to claim 1, wherein the longitudinal groove extends along the hub to the connecting portion.

4. The suspension thrust bearing according to claim 1, wherein the longitudinal groove extends from the connecting portion to the flange.

5. The suspension thrust bearing according to claim 1, wherein the first end of the longitudinal groove is open to a lower edge of the hub.

6. The suspension thrust bearing according to claim 1, wherein the first end of the longitudinal groove is a transverse wall.

7. The suspension thrust bearing according to claim 1, wherein the lower part provides a plurality of parallel longitudinal grooves.

8. The suspension thrust bearing according to claim 1, wherein additional retention means are provided to the hub and/or the flange.

9. Suspension thrust bearing according to claim 8, wherein the additional retention means provides a set of parallel longitudinal grooves extending only along the flange and/or extending only the hub.

10. Suspension thrust bearing according to claim 9, wherein each of the additional longitudinal grooves is in the extension of a longitudinal groove that at least partly extends along the connecting portion, a protrusion of material longitudinally separating the two grooves.

11. Suspension thrust bearing according to claim 8, wherein then additional retention means consist in a set of pins provided only on the flange and/or provided only on the hub.

* * * * *